3,198,776
METHOD FOR PRODUCING COPOLYMERS OF ETHYLENE AND t-BUTYL ACRYLATE
Mary L. Miller, New York, N.Y., and Carol E. Rauhut, Stamford, Conn., assignors to American Cyanamid Company, New York, N.Y., a corporation of Maine
No Drawing. Filed May 19, 1960, Ser. No. 30,102
6 Claims. (Cl. 260—86.7)

The present invention relates to the polymerization and copolymerization of tertiary alkyl esters of certain unsaturated carboxylic acids. More particularly, the invention relates to the preparation of homopolymers of t-alkyl esters such as t-butyl acrylate, t-butyl methacrylate, t-amyl acrylate and t-butyl crotonate and copolymers of these compounds with α-olefins, styrene, substituted styrenes and acetylene through the use of catalyst compositions which have been known heretofore in the specific art of low pressure olefin polymerization. Moreover, the copolymers of these esters with α-olefins and acetylene are also novel and are properly part of this invention.

It is well known that certain catalyst systems which comprise metal alkyls wherein the metal is one from Groups I, II, and III of the Periodic System and the halides of transition metals from Groups IV thru VII of the Periodic System polymerize oefins, such as ethylene and propylene at room temperatures and atmospheric pressures. It is new, however, to employ these catalyst systems to polymerize t-alkyl esters.

It is quite surprising and unexpected that the polymers prepared through the use of these well known ionic type catalyst systems can be obtained since it is well known that the components of these catalyst systems are easily destroyed by water and oxygen-containing compounds, such as esters which have an active oxygen, for example, methyl, ethyl and n-butyl acrylate. Applicants have found that certain esters of compounds containing the >C=C< group such as acrylic acid containing t-alkyl substituents can be polymerized using these catalyst systems. This specific reaction may possibly be ascribed to the shielding action of the bulky group since it is obvious that an active oxygen is present in these esters. This shielding action is merely a plausible explanation and is not intended that the instant invention be in any way contingent upon this hypothesis.

The present invention is carried out by polymerizing the particular monomer in the presence of the above-mentioned catalysts in a solvent at room temperature or at temperatures as high as 50° C. and as low as —70° C. The preferred catalyst systems are mixtures of n-butyl lithium and titanium tetrachloride, the alkyl aluminums and TiCl₄ and aluminum dialkyl chloride and TiCl₄ in a weight ratio ranging from 1:5 to 20:1. The catalyst concentration may vary from 0.001 to 0.1 mole per 100 ml. Higher concentrations, of course, may be employed depending upon the desired amount of polymer plus the fact that variations in procedure, such as semi-continuous processes may demand the presence of much more catalyst.

The polymerizable monomers which are operative in the present invention are all of the tertiary esters of the lower monoethylenically unsaturated monocarboxylic acids such as acrylic, methacrylic and crotonic acids and the tertiary esters of the lower α, β-monoethylenically unsaturated dicarboxylic acids such as fumaric and maleic acid. These esters are conveniently formed through esterification of any of the above-mentioned acids with any teritary alcohol such as 1,1-dimethyl ethanol, 1,1-diethyl propanol, 1,1-dimethyl propanol, 1-methyl, 1-ethyl propanol, 1-phenyl, 1-methyl ethanol, 1-phenyl, 1-methyl propanol and 1-phenyl, 1-ethyl propanol.

Monomers which may be copolymerized with the above esters are the α-olefins containing from 2 to 4 carbon atoms, acetylene, styrene and the various styrenes containing one and two methyl groups substituted on the aromatic nucleus. The comonomer may be present in amounts ranging from about 0.1% by weight to about 99%. The starting concentrations are always determined with relative polymerization rates in mind. Where there are very small amounts of either the ester or comonomer present in the copolymer there is a notable difference in the melting point from the homopolymers of either of the components.

The catalyst systems which may be used to carry out the polymerization include a wide variety of compositions. They include the compositions comprising mixtures of said composition with a catalyst composed of a mixture of (1) a metal alkyl represented by the general formula

$$MR_mR'_n$$

where $m$ is an integer of 1 to 3 inclusive, $n$ is an integer of 0 to 2 inclusive, M represents a metal selected from the class consisting of metals of Groups I, II and III of the Periodic System, R represents a hydrocarbon radical selected from the class consisting of alkyl and aryl radicals, R' represents at least one member of the class of radicals consisting of alkyl, alkoxy, halogen, alkyl nitrogen and sulfur and (2) a compound represented by the general formula

$$M'X_p$$

where $p$ is an integer of from 1 to 4 inclusive, M' is a metal selected from the class consisting of the transition metals from Groups IV, V, VI, VII of the Periodic System, iron and copper and X represents at least one member selected from the class of radicals consisting of halogen, oxylhalogen, oxides, alkoxy, acetoxy, and benzoyl radicals.

The solvent to be employed should be one which would not destroy the catalyst, that is one which is oxygen-free and that is chemically inert to the components of the catalyst system. These solvents or diluents include aliphatic hydrocarbons and aromatic hydrocarbons, such as pentane, hexane, higher paraffins, cyclohexane, tetra hydronaphthalene, deca hydronaphthalene, benzene, xylene and halogenated hydrocarbons. There is no criticality in the concentration of the reactant monomers.

Upon completion of the polymerization reaction, the catalyst is completely deactivated by the addition of an alcohol such as methanol, isopropyl or n-butyl alcohol, water or mixtures of these in amounts of about 10 to 100 times of the catalyst to be used. The polymer is extracted from the resulting slurry by filtration and extraction with additional alcohol or alcohol and water and with boiling acetone.

The following examples are presented by way of illustration and not by way of limitation. Unless otherwise specified, all parts are expressed as parts by weight.

DESCRIPTION OF INVENTION

Example 1

A reaction vessel equipped with nitrogen and ethylene inlet tubes, stirrer, addition funnel and outlet tube is flushed with dry nitrogen and charged with 100 parts of dry oxygen-free petroleum ether. 0.08 part of n-butyl lithium as a 0.124 molar solution in heptane is added with a syringe and then 0.94 part of titanium tetrachloride is added. This catalyst mixture is aged, with stirring, 10 minutes at room temperature, then introduction of t-butyl acrylate and of ethylene is started. 4.4 parts of pure, dry t-butyl acrylate is introduced drop by drop over a period of 5 minutes and the ethylene is bubbled in the reaction mixture for 30 minutes. At the end of 30 minutes the reaction is stopped by the addition of aqueous menthol. The polymer is washed with methanol until nearly white, then it is extracted with boiling acetone followed by boiling chloroform to remove homopolymer of t-butyl acrylate. The undissolved polymer consists of white granules which assays 5% t-butyl acrylate when examined by infrared.

*Example II*

Same as Example I but t-butyl methacrylate is used. The final polymer contains about 5% t-butyl methacrylate.

*Example III*

Like Example I but the t-butyl acrylate is added over a period of 30 minutes. The final polymer assays approximately 50% t-butyl acrylate.

*Example IV*

Like Example I but propylene is used instead of ethylene. The final polymer assays approximately 50/50 t-butyl acrylate/propylene.

*Example V*

The reaction vessel is equipped with a nitrogen outlet and inlet, stirrer and dropping funnel, but no ethylene inlet. The vessel is charged as in Example I and the catalyst is prepared and aged as in Example I. The t-butyl acrylate is added dropwise, with stirring over a period of 30 minutes. The reaction is quenched with aqueous methanol. The polymer is washed with methanol until white and the extracted with boiling acetone followed by boiling chloroform to remove amorphous polymer. The yield is 38% of which half is highly crystalline as shown by X-ray and infrared examination.

*Example VI*

Same as Example III but 1.08 parts of $TiCl_4$ is used as a catalyst and 0.34 part of tri-n-butyl aluminum as a 1.07 molar solution in heptane.
The polymer consists of 50% t-butyl acrylate.

*Example VIII*

The arrangement is the same as in Example I. 0.55 part of anhydrous molybdenum pentachloride is put into petroleum ether. Then 0.32 part of n-butyl lithium is added as a 1.07 molar solution in heptane. The catalyst is aged 10 minutes. Ethylene flow is started, followed by addition of t-butyl acrylate. The polymerization is rapid. The polymer is soluble in boiling chloroform and consists almost entirely of poly(t-butyl acrylate).

*Example VIII*

A reaction vessel equipped with nitrogen and ethylene inlet tubes, stirrer, break-seal joint, and outlet tube is flushed with dry nitrogen and charged with 100 parts of dry oxygen-free petroleum ether. 1.4 parts of diethyl zinc as a 25% solution in heptane are added with a syringe followed by 1.08 parts of titanium tetrachloride. This catalyst mixture is aged, with stirring, for 10 minutes, then ethylene is bubbled in for 5 minutes. Then t-butyl acrylate and ethylene are added together for a period of 45 minutes. The reaction mixture is stirred an additional 60 minutes, quenched with aqueous methanol, stirred 30 minutes and filtered. The polymer is washed with aqueous methanol, then extracted with boiling chloroform. The undissolved polymer consists of granules which assays 10% t-butyl acrylate when it is analysed by infrared spectroscopy.

*Example IX*

Same as Example VIII but 1.08 parts of titanium tetrachloride is used and 1.6 parts of trihexyl aluminum as a 50% solution in heptane to make the catalyst. The final polymer contains about 2% t-butyl acrylate.

*Example X*

Same as Example VIII except 1.11 parts of vanadium tetrachloride and 0.5 part of n-butyl lithium as a 1.07 molar solution in heptane are used to make the catalyst. The final polymer contains about 30% t-butyl acrylate.

*Example XI*

Same as Example III except that 0.86 part of $TiCl_4$ and 1.3 parts of triethyl aluminum as a 1.27 molar solution in heptane are used to make the catalyst. The final polymer contains about 5–10% acrylate.

*Example XII*

Chromic chloride, anhydrous, 0.84 part is put into the reaction vessel which has been flushed with dry nitrogen. 100 parts of petroleum ether are introduced and the system is degassed, boiled under vacuum, flushed with nitrogen and boiled for 5 minutes. A nitrogen atmosphere is introduced and 0.57 part of triethyl aluminum as a 1.27 molar solution in heptane is added with stirring. The catalyst is aged 10 minutes then ethylene introduced alone for 10 minutes followed by addition of ethylene and t-butyl acrylate for 40 minutes. Stirring is continued for 20 hours. The reaction mixture is quenched with 100 parts of a 1:1 methanol:water mixture, stirred for one half hour and filtered. The precipitate is shaken with water into which has been placed some metallic tin (to convert the insoluble chromium salt to a soluble modification.) The mixture is filtered, air-dried and extracted with boiling chloroform. The polymer, unlike ordinary poly t-butyl acrylate, is insoluble in boiling chloroform. This insolubility indicates that the polymer contains enough ethylene to change the solubility. However, infrared examination shows the polymer to be almost entirely poly (t-butyl acrylate).

*Example XIII*

Same as Example XII, except that the metallic chloride is ferric chloride, 1.06 parts, and metallic tin is not added in the procedure. The polymer is the same as in Example XII.

*Example XIV*

Example XIV is a repetition of Example III except that a 50/50 mixture of t-butyl acrylate and styrene is used and there is no ethylene. The polymer contains 20% styrene and 80% t-butyl acrylate.

*Example XV*

*Polymerization.*—To 0.30 part of n-butyl lithium in 100 parts of petroleum ether are added 0.30 part of titanium tetrachloride. The catalyst is aged 10 minutes, after which the 4 parts of t-amyl acrylate are added over a period of 30 minutes. The mixture is stirred for 2 hours and then quenched with a 1:1 methanol:water mixture. The polymer slurry is left standing overnight. The next day, the polymer is collected, washed with methanol/water and examined by infrared. The polymer is poly (t-amyl acrylate).

*Example XVI*

To 0.50 part of n-butyl lithium in 100 parts of petroleum ether are added 0.60 part of titanium tetrachloride. This catalyst is stirred 10 minutes and then ethylene bubbled in for 10 minutes. The 4 parts of t-amyl acrylate are added, along with ethylene, for a period of 30 minutes. The reaction mixture is stirred for 2 hours and then quenched with a 1:1, methanol:water, mixture. The polymer is filtered out, washed, refiltered, dried and then extracted with boiling chloroform. The chloroform soluble fraction is a copolymer of t-amyl acrylate containing 2–10% ethylene.
The chloroform insoluble fraction is polyethylene.

*Example XVII*

0.96 part of diethyl aluminum chloride (DEAC) (in kerosene solution) are added to 100 parts of petroleum ether and then 0.47 part of titanium tetrachloride are added. The catalyst is aged 10 minutes, then ethylene bubbled in for 10 minutes. The t-butyl acrylate and ethylene are added at the same time over a period of 20 minutes. The reaction mixture is stirred 2 hours and allowed to stand overnight. It is then quenched with a 1:1, methanol:water, mixture, filtered, washed and refiltered, dried and then extracted with boiling chloroform.

The chloroform soluble fraction is a copolymer containing polyethylene and acrylate. The chloroform insoluble fraction is a copolymer of t-butyl acrylate and ethylene in a ratio of 1:1. The polymer is a very light yellowish color.

*Example XVIII*

The general method of Example XVIII is used except that the catalyst is made with 0.011 part of amyl sodium as a slurry in pentane, and 0.30 part of TiCl$_4$. Infrared analysis shows the product to contain both ethylene and t-butyl acrylate.

*Example XIX*

The t-butyl crotonate and ethylene are copolymerized by the procedure of Example XVII. 0.35 part of n-butyl lithium, as a 1.07 molar solution in heptane, and 0.30 part of titanium tetrachloride are used to make the catalyst.

The product is a copolymer of t-butyl crotonate and ethylene containing 80% ethylene mixed with some homopolymer of t-butyl crotonate.

*Example XX*

This example is the same as Example XVII except that well purified acetylene is used instead of ethylene. Infrared examination shows the polymer to contain both acetylene and t-butyl acrylate.

The homopolymers of the above-mentioned esters have been found to have extremely high molecular weight, e.g., t-butyl acrylate when polymerized by the method of the instant invention results in a polymer having a molecular weight of 1,500,000 while many of the copolymers with the esters are not quite so high depending on the amount of olefin or acetylene present in the copolymer. When the olefin is present in major amounts the molecular weight is significantly less than 1,500,000 and approaches 15,000 to 20,000 as the proportion of the olefin is increased. Of course the actual cross section of obtainable products include both the low molecular weight semi liquid type materials and the extremely high molecular weight hard tough materials.

The polymers and copolymers of the present invention are useful for making films, fibers, molding compounds, etc. They are also useful as intermediates for making other copolymers of ethylene which cannot be made by direct copolymerization. For example, any of the ester groups which are attached to the chain of the polymer may be converted to carboxyl methyl and ethyl groups through hydrolysis and/or esterification and transesterification. Moreover, other operations such as amidation may be performed to introduce amide groups which may be further reduced with a hypohalide in a Hoffman degradation-type reaction to primary amine groups.

The following examples illustrate the introduction of carboxyl radicals through hydroylsis of the polymers prepared by the method of the present invention.

*Example XXI*

Five parts of a copolymer containing 50 mole percent ethylene and 50 mole percent t-butyl acrylate is added to 500 parts of redistilled tetralin. 0.5 part of p-toluene sulfonic acid is added and the mixture heated to 130° C. and kept at that temperature 15 minutes. The polymer swells and partly dissolves. When the mixture is cooled, the polymer reprecipitates. The polymer is filtered off, washed two times with petroleum ether and air dried. The treated polymer is shown by infrared examination to contain 50 mole percent ethylene and 50 mole percent acrylic acid.

*Example XXII*

A copolymer containing 50/50 ethylene and t-butyl acrylate is refluxed for 30 minutes in boiling decalin. The polymer swells but does not entirely dissolve. The polymer is precipitated by cooling, filtered off, washed in boiling benzene and dried. Infrared examination shows that the t-butyl acrylate has been converted to acrylic acid.

The structures of the polymers herein disclosed have been determined by infrared and, in some cases, by elemental analysis. The homopolymers are usually highly crystalline, unlike polymers which have been prepared with a free radical initiating catalyst, such as benzoyl peroxide.

We claim:

1. A method which comprises polymerizing a composition consisting essentially of from about 0.1% to about 99.9% of a tertiary alkyl ester of a monoethylenically unsaturated monocarboxylic acid, said alkyl group containing from 4–5 carbon atoms, inclusive, and said acid containing from 3–4 carbon atoms, inclusive, and from about 99.9% to about 0.1% of an α-olefin having 2–3 carbon atoms, inclusive, at a temperature of from about −70° C. to about 50° C. and a pressure not higher than about atmospheric in the presence of a chemically inert, oxygen-free solvent and from about 0.001 to 0.1 mole per 100 ml. of said monomer composition, of a catalyst composed of a mixture of (1) a metal alkyl represented by the general formula

$$MR_mR'_n$$

wherein $m$ is an integer of from 1–3, inclusive, $n$ is an integer of from 0–1, inclusive, M is selected from the group consisting of lithium, aluminum, and zinc, R represents an alkyl radical having from 2–6 carbon atoms, inclusive, and R' represents a chlorine atom and (2) a compound represented by the general formula

$$M'X_p$$

wherein $p$ is an integer of from about 3–5, inclusive, M' is a metal selected from the group consisting of titanium, vanadium, iron, molybdenum and chromium and X represents chlorine and the ratio of (1):(2) is from about 1:5 to about 20:1.

2. A process according to claim 1 wherein the catalyst is a mixture of n-butyl lithium and titanium tetrachloride.

3. A method according to claim 1 wherein the catalyst is a mixture of diethyl aluminum chloride and titanium tetrachloride.

4. A method according to claim 1 wherein the catalyst is a mixture of n-butyl lithium and vanadium tetrachloride.

5. A method according to claim 4 wherein the catalyst is a mixture of triethyl aluminum and chromic chloride.

6. A method according to claim 1 wherein the catalyst is a mixture of tri-n-butyl aluminum and titanium tetrachloride.

References Cited by the Examiner

UNITED STATES PATENTS

| | | | |
|---|---|---|---|
| 2,449,489 | 9/48 | Larson | 260—86.7 |
| 2,504,049 | 4/50 | Richards | 260—89.5 |
| 2,657,200 | 10/53 | McGrew et al. | 260—86.7 |
| 2,808,349 | 10/57 | Melamed | 260—86.7 |
| 2,910,461 | 10/59 | Nowlin et al. | 260—94.9 |
| 2,996,488 | 8/61 | Mital et al. | 260—86.7 |

FOREIGN PATENTS 833,579   4/60   Great Britain.

OTHER REFERENCES

Garrett et al., J. Am. Soc., 81, 1007–8 (Feb. 1959).

JOSEPH L. SCHOFER, *Primary Examiner.*

MILTON STERMAN, PHILIP MANGAN, LOUISE P. QUAST, JOSEPH R. LIBERMAN, LEON J. BERCOVITZ, *Examiners.*

UNITED STATES PATENT OFFICE

CERTIFICATE OF CORRECTION

Patent No. 3,198,776                      August 3, 1965

Mary L. Miller et al.

It is hereby certified that error appears in the above numbered patent requiring correction and that the said Letters Patent should read as corrected below.

Column 1, line 26, for "oefins" read -- olefins --; column 3, line 39, for "Example VIII", in italics, read -- Example VII --, in italics; column 5, line 12, for "XVIII" read -- XVII --; column 6, line 50, for the claim reference numeral "4" read -- 1 --.

Signed and sealed this 1st day of February 1966.

(SEAL)
Attest:

ERNEST W. SWIDER
Attesting Officer

EDWARD J. BRENNER
Commissioner of Patents